United States Patent
Jun

(10) Patent No.: US 10,094,722 B2
(45) Date of Patent: Oct. 9, 2018

(54) TORQUE SENSOR DEVICE

(71) Applicant: LS AUTOMOTIVE CORP, Ansan-si, Gyeonggi-do (KR)

(72) Inventor: Chang Nam Jun, Suwon-si (KR)

(73) Assignee: LS AUTOMOTIVE TECHNOLOGIES CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/508,622

(22) PCT Filed: Sep. 4, 2015

(86) PCT No.: PCT/KR2015/009341
§ 371 (c)(1),
(2) Date: Mar. 3, 2017

(87) PCT Pub. No.: WO2016/036185
PCT Pub. Date: Mar. 10, 2016

(65) Prior Publication Data
US 2017/0276557 A1    Sep. 28, 2017

(30) Foreign Application Priority Data

Sep. 5, 2014 (KR) .................. 10-2014-0119318
Sep. 5, 2014 (KR) .................. 10-2014-0119321
Sep. 5, 2014 (KR) .................. 10-2014-0119322

(51) Int. Cl.
*G01L 3/02* (2006.01)
*G01L 3/10* (2006.01)
(Continued)

(52) U.S. Cl.
CPC ............... *G01L 3/104* (2013.01); *B62D 6/10* (2013.01); *G01L 5/221* (2013.01); *B62D 5/04* (2013.01); *G01L 25/003* (2013.01)

(58) Field of Classification Search
CPC ....... G01L 3/104; G01L 5/221; G01L 25/003; B62D 6/10; B62D 5/04
(Continued)

(56) References Cited

U.S. PATENT DOCUMENTS

2008/0314164 A1* 12/2008 Masson .................. G01L 3/104
                                                   73/862.333
2010/0084215 A1* 4/2010 Sakatani ................. B62D 6/10
                                                   180/444

(Continued)

FOREIGN PATENT DOCUMENTS

JP     2008-216019 A    9/2008
KR     10-0983963 B1    9/2010
(Continued)

*Primary Examiner* — Max Noori
(74) *Attorney, Agent, or Firm* — Rabin & Berdo, P.C.

(57) ABSTRACT

Provided is a torque sensor device to detect a torque between an input shaft and an output shaft through a relative rotation displacement therebetween. The torque sensor device includes: a housing to accommodate an end of the input shaft and an end of the output shaft: a magnet unit rotatably accommodated in the housing to be connected to one end of one of the input shaft and the output shaft; a collector unit rotatably accommodated in the housing to be connected to one end of the other of the input shaft and the output shaft, the collector unit forming a magnetic circuit together with the magnet unit; and a sensing unit including a torque sensor disposed at the outer circumference of the collector unit and configured to detect a magnetic field focused by the collector unit. The collector unit includes a lower collector including an annular lower collector ring.

4 Claims, 8 Drawing Sheets

(51) Int. Cl.
*G01L 5/22* (2006.01)
*B62D 6/10* (2006.01)
*B62D 5/04* (2006.01)
*G01L 25/00* (2006.01)

(58) Field of Classification Search
USPC .................................................. 73/862.193
See application file for complete search history.

(56) References Cited

U.S. PATENT DOCUMENTS

| | | | |
|---|---|---|---|
| 2012/0073386 A1* | 3/2012 | McDonald | B62D 6/10 73/862.09 |
| 2012/0260746 A1 | 10/2012 | Lee | |
| 2013/0192390 A1* | 8/2013 | Shidahara | G01L 3/101 73/862.325 |
| 2013/0220030 A1* | 8/2013 | Nishikawa | G01L 3/101 73/862.331 |
| 2013/0305843 A1* | 11/2013 | Lee | G01L 3/104 73/862.325 |
| 2014/0283623 A1* | 9/2014 | Song | B62D 6/10 73/862.193 |

FOREIGN PATENT DOCUMENTS

| | | |
|---|---|---|
| KR | 10-1020420 B1 | 3/2011 |
| KR | 2012-0117294 A | 10/2012 |
| KR | 10-2013-063214 A | 6/2013 |

\* cited by examiner

TORQUE SENSOR DEVICE

TECHNICAL FIELD

The present invention relates to a torque sensor, and more particularly, to a torque sensor for detecting a torque applied to a shaft including an input shaft and an output shaft.

BACKGROUND ART

In general, a vehicle wheel which is in contact with a road surface rotates according to a rotation of a steering wheel during traveling or stopping of a vehicle. In other words, when the steering wheel rotates to the left or right, the vehicle wheel rotates in the same direction as the rotation direction of the steering wheel. However, there may be a problem in that because the vehicle wheel is in contact with the road surface, the rotation amounts of the steering wheel and the vehicle wheel become different from each other due to a friction generated between the vehicle wheel and the road surface. For this reason, a driver needs a large force to manipulate the steering wheel.

The vehicle includes a power steering (PS) system as a steering force auxiliary device. In the power steering system, the coverage of an EPS scheme using an electric motor is being expanded in a passenger vehicle used in a real life.

For the purpose of power assistance, the power steering system is provided with a torque sensor that measures a deviation in the rotation angle between an input shaft side connected to the steering wheel and an output shaft side connected to the vehicle wheels in order to detect a torque load between the both shafts.

The torque sensor is largely divided into a contact type and a contactless type. Because the contact type entails a problem in that a noise is generated and durability is reduced, the contactless type has been preferred recently. In addition, the contactless type torque sensor is roughly classified into a magnetic resistance detection type, a magnetic deformation detection type, a capacitance detection type, and an optical detection type.

Meanwhile, a conventional magnetic resistance detection type torque sensor, which is provided in an electric power steering system, includes an input shaft whose upper end is coupled to the steering wheel manipulated by a driver and an output shaft whose upper end is coupled to a lower end of the input shaft through a torsion bar. A lower end of the output shaft is connected to a vehicle wheel. The lower end of the input shaft including the torsion bar and the upper end of the output shaft are covered by a housing, which has accommodated therein the torque sensor and the power means as described above. In this case, the input shaft includes a permanent magnet whose magnetic polarities are alternately arranged at regular intervals. Also, the output shaft is provided with a detection ring having a gear structure of which number of polarities correspond to the number of polarities of the permanent magnet and which is made of a ferromagnetic substance that can generate a magnetic induction caused by the permanent magnet included in the input shaft. The detection ring is constructed such that a sensor for detecting magnetism is connected thereto. In this case, a relative twist between the permanent magnet provided at the input shaft and the detection ring of the gear structure provided at the output shaft causes a change in area where the permanent magnet and the detection ring face each other. Accordingly, a magnetic flux is changed in the detection ring and the change of the magnetic flux is detected by the sensor so that a twist angle of the output shaft relative to the input shaft can be detected.

However, the conventional contactless type torque sensor encounters problems in that an excessive number of constituent elements are required and an assembly process is complicated, thus leading to increases in the possibility of erroneous operation and the manufacturing cost, and to an exposure of a problem associated with durability period of the torque sensor due to the excessive number of constituent elements.

Further, for the conventional type torque sensor involves a problem in that the permanent magnet and two tooth rings corresponding to the permanent magnet are interlaced with each other, thus resulting in an increase in the leakage magnetic flux.

DISCLOSURE OF INVENTION

Technical Problem

Accordingly, the present invention has been made to solve the above-mentioned problems occurring in the prior art, and it is an object of the present invention to provide a torque sensor device which can be manufactured with a simple structure, can increase sensitivity and detection reliability, and can reduce the manufacturing cost.

Technical Solution

To achieve the above object, in one aspect, the present invention provides a torque sensor device disposed between an input shaft and an output shaft and configured to detect a torque between the input shaft and the output shaft through a relative rotation displacement therebetween, the torque sensor device including: a housing configured to accommodate an end of the input shaft and an end of the output shaft and fixed in position to be able to perform a relative rotation with respect to the input shaft and the output shaft: a magnet unit rotatably accommodated in the housing in such a manner as to be connected to one end of one of the input shaft and the output shaft; a collector unit rotatably accommodated in the housing in such a manner as to be at least partially connected to one end of the other of the input shaft and the output shaft, the collector unit being configured to form a magnetic circuit together with the magnet unit; and a sensing unit including a torque sensor disposed at the outer circumference of the collector unit and configured to detect a magnetic field focused by the collector unit, wherein the collector unit comprises a lower collector including an annular lower collector ring disposed radially and circumferentially at one end of the other of the input shaft and the output shaft.

In another aspect, the present invention provides a torque sensor device disposed between an input shaft and an output shaft and configured to detect a torque between the input shaft and the output shaft through a relative rotation displacement therebetween, the torque sensor device including: a housing configured to accommodate an end of the input shaft and an end of the output shaft and fixed in position to be able to perform a relative rotation with respect to the input shaft and the output shaft: a magnet unit including a magnet ring rotatably accommodated in the housing in such a manner as to be connected to one end of one of the input shaft and the output shaft; a collector unit rotatably accommodated in the housing in such a manner as to be at least partially connected to one end of the other of the input shaft and the output shaft, the collector unit being configured to form a magnetic circuit together with the magnet unit; and a sensing unit including a torque sensor disposed at the outer circumference of the collector unit and configured to detect a magnetic field focused by the collector unit. The collector unit may include: a lower collector rotatably disposed to be opposite to the magnet ring; and a fixing collector which is fixed in position to the housing in such a manner as to be disposed at the lower collector in a spaced manner, and at whose end side the torque sensor is disposed. The lower collector may include: an annular lower collector ring disposed radially and circumferentially at one end of the other of the input shaft and the output shaft; and a lower collector tooth array composed of a plurality of lower collector teeth formed extending radially from an inner circumferential end of the lower collector ring in such a manner as to be circumferentially spaced apart from each other at equal angular intervals. The lower collector tooth array may be formed in a radial direction of the other of the input shaft and the output shaft.

In the torque sensor device, the fixing collector may include: a lower fixing collector disposed on the lower collector ring in a spaced manner so as to confront the lower collector ring; and an upper fixing collector disposed to be opposite to an at least part of the lower collector tooth array with the magnet ring interposed between the upper fixing collector and the at least part of the lower collector tooth array.

In the torque sensor device, the upper fixing collector may include: an arcuate-shaped upper fixing plate disposed to be opposite to the at least part of the lower collector tooth array; and an upper fixing terminal formed extending from an end of the upper fixing plate. The lower fixing collector may include: an arcuate-shaped lower fixing plate disposed to be opposite to an at least part of the lower collector ring; and a lower fixing terminal formed extending from an end of the lower fixing plate. The torque sensor may be disposed between the upper fixing terminal and the lower fixing terminal In the torque sensor device, the radial length of the upper fixing plate may be larger than the radial length of the lower fixing plate.

In another aspect, the present invention provides a torque sensor device disposed between an input shaft and an output shaft and configured to detect a torque between the input shaft and the output shaft through a relative rotation displacement therebetween, the torque sensor device including: a housing configured to accommodate an end of the input shaft and an end of the output shaft and fixed in position to be able to perform a relative rotation with respect to the input shaft and the output shaft: a magnet unit including a magnet block rotatably accommodated in the housing in such a manner as to be connected to one end of one of the input shaft and the output shaft; a collector unit rotatably accommodated in the housing in such a manner as to be at least partially connected to one end of the other of the input shaft and the output shaft, the collector unit being configured to form a magnetic circuit together with the magnet unit; and a sensing unit including a torque sensor disposed at the outer circumference of the collector unit and configured to detect a magnetic field focused by the collector unit. The collector unit may include: a lower collector rotatably disposed to be opposite to the magnet block; and a fixing collector which is fixed in position to the housing in such a manner as to be disposed at the lower collector in a spaced manner, and at whose end side the torque sensor is disposed. The lower collector may include: an annular lower collector ring disposed radially and circumferentially at one end of the other of the input shaft and the output shaft; and a lower collector tooth array composed of a plurality of lower collector teeth formed extending radially from an inner circumferential end of the lower collector ring in such a manner as to be circumferentially spaced apart from each other at equal angular intervals. The lower collector tooth array may be formed in a radial direction of the other of the input shaft and the output shaft.

In the torque sensor device, the fixing collector may include: a lower fixing collector disposed on the lower collector ring in a spaced manner so as to confront the lower collector ring; and an upper fixing collector disposed to be opposite to an at least part of the lower collector tooth array with the magnet block interposed between the upper fixing collector and the at least part of the lower collector tooth array.

In the torque sensor device, the upper fixing collector may include: an arcuate-shaped upper fixing plate disposed to be opposite to the at least part of the lower collector tooth array; and an upper fixing terminal formed extending from an end of the upper fixing plate. The lower fixing collector may include: an arcuate-shaped lower fixing plate disposed to be opposite to an at least part of the lower collector ring; and a lower fixing terminal formed extending from an end of the lower fixing plate. The torque sensor may be disposed between the upper fixing terminal and the lower fixing terminal.

In the torque sensor device, the radial length of the upper fixing plate may be larger than the radial length of the lower fixing plate.

In still another aspect, the present invention provides a torque sensor device disposed between an input shaft and an output shaft and configured to detect a torque between the input shaft and the output shaft through a relative rotation displacement therebetween, the torque sensor device including: a housing configured to accommodate an end of the input shaft and an end of the output shaft and fixed in position to be able to perform a relative rotation with respect to the input shaft and the output shaft: a magnet unit including a magnet ring rotatably accommodated in the housing in such a manner as to be connected to one end of one of the input shaft and the output shaft; a collector unit rotatably accommodated in the housing in such a manner as to be at least partially connected to one end of the other of the input shaft and the output shaft, the collector unit being configured to form a magnetic circuit together with the magnet unit; and a sensing unit including a torque sensor disposed at the outer circumference of the collector unit and configured to detect a magnetic field focused by the collector unit. The collector unit may further include: an upper collector disposed to be oriented toward one of the input shaft and the output shaft; a lower collector disposed so as to be spaced apart from the upper collector; and a fixing collector fixed in position to the housing so as to be disposed at the outer circumferences of the upper collector and the lower collector in a spaced manner with the torque sensor interposed between one ends of the fixing collector. The upper collector may include: an annular upper collector ring disposed radially and circumferentially at one end of the other of the input shaft and the output shaft; and an upper collector tooth array composed of a plurality of upper collector teeth which are formed extending downwardly from an inner circumferential end of the upper collector ring in such a manner as to be circumferentially spaced apart from each other at equal angular intervals. The lower collector may include: a lower collector including an annular lower collector ring disposed radially and circumferentially at one end of the other of the input shaft and the output shaft; and a lower collector tooth array composed of a plurality of lower collector teeth which are formed extending radially from an inner circumferential end of the lower collector ring in such a manner as to be circumferentially spaced apart from each other at equal angular intervals. One of the upper collector tooth array and the lower collector tooth array may be formed in the axial longitudinal direction of the input shaft and the output shaft, and the other of the upper collector tooth array and the lower collector tooth array may be formed in the radial direction of the input shaft and the output shaft.

In the torque sensor device, the upper collector tooth array may be formed at the output shaft in the longitudinal direction of the output shaft.

In the torque sensor device, the magnet ring may be provided in pair, and the lengths of the two magnet rings in the axial longitudinal direction of the input shaft and the output shaft may be different from each other.

In the torque sensor device, a magnet ring having a larger length of the two magnet rings in the axial longitudinal direction of the input shaft and the output shaft may be disposed at the upper collector tooth array, and the length of the upper collector tooth array in the longitudinal length of the output shaft may be larger than the axial length of the magnet ring having the larger length of the two magnet rings in the axial longitudinal direction of the input shaft and the output shaft.

In the torque sensor device, a magnet ring having a smaller length of the two magnet rings in the axial longitudinal direction of the input shaft and the output shaft may be disposed at the lower collector tooth array, and the length of the lower collector tooth array in the radial direction of the output shaft may be larger than the radial length of a magnet ring having a smaller length of the two magnet rings in the radial direction of the input shaft and the output shaft.

In the torque sensor device, the magnet ring may include: an upper magnet ring disposed to correspond to the upper collector; and a lower magnet ring disposed to confront the lower collector. N poles and S poles of each of the upper magnet ring and the lower magnet ring may be alternately arranged in a circumferential direction, and the aspect ratio (ARu) of the upper ring magnet may be less than the aspect ratio (AB1) of the lower magnet ring with respect to the cross-section formed in the longitudinal direction of the input shaft and the output shaft.

In the torque sensor device, the magnetic field lines of the upper magnet ring may be formed in a circumferential direction on a circumferential surface of the upper magnet ring, which is parallel to the longitudinal direction of the input shaft and the output shaft, and the magnetic field lines of the lower magnet ring may be formed in the longitudinal direction of the input shaft and the output shaft on a circumferential surface of the lower magnet ring, which is perpendicular to the longitudinal direction of the input shaft and the output shaft.

Advantageous Effects

The torque sensor device according to the embodiments of the present invention as constructed above have the following advantageous effects.

First, the torque sensor device of the present invention takes a structure in which the collector of the collectors unit is disposed vertically so that the amount of a magnetic flux leaked can be minimized and the amount of a magnetic flux transferred to the torque sensor can be increased, thereby achieving a more accurate detection of the torque.

Second, the torque sensor device of the present invention can simplify a product manufacturing process and significantly reduce the manufacturing costs by remarkably reducing the amount of materials consumed while improving and maintaining the performance of the device through a structure in which a single lower collector is disposed.

Third, the torque sensor device of the present invention can simplify a product manufacturing process and significantly reduce the manufacturing costs by remarkably reducing the amount of materials consumed while improving and maintaining the performance of the device through a spaced-apart magnet block structure besides a magnet ring structure.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Figure 1:
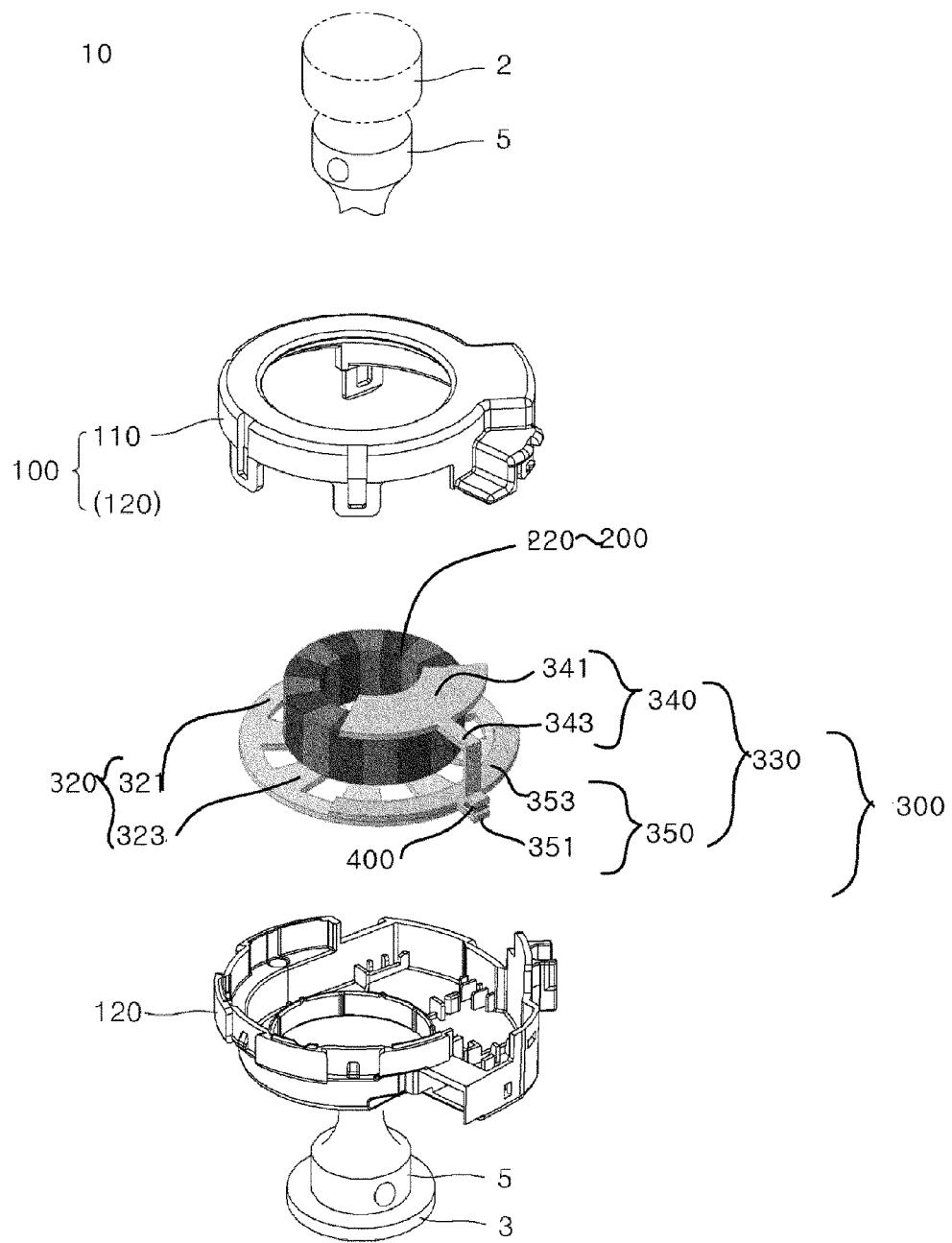
FIG. 1 is a schematic exploded perspective view showing a torque sensor device according to one embodiment of the present invention.

Hereinafter, the configuration and operation of a torque sensor device 10 of the present invention will be described in detail with reference to the accompanying drawings.

The torque sensor device 10 of the present invention includes a housing 100, a magnet unit 200, a collector unit 300, and a sensing unit 400. The torque sensor device 10 of the present invention is disposed between an input shaft 2 and an output shaft 3 and detects a torque between the input shaft 2 and the output shaft 3 through a relative rotation displacement therebetween.

First, one embodiment of the present invention will be described hereinafter with reference to FIGS. 1 to 3.

The housing 100 accommodates an end of the input shaft 2 and an end of the output shaft 3 and is fixed in position to be able to perform a relative rotation with respect to the input shaft 2 and the output shaft 3.

The housing 100 includes a housing cover 110 and a housing base 120. The housing cover 110 is engaged with the housing base 120 to define an internal space that accommodates other constituent elements.

The housing cover 110 is disposed at the input shaft, and the housing base 120 is disposed at the output shaft 3 so as to confront the housing cover 110. The housing cover 110 includes a housing cover mounting part (not shown) formed at the outer circumference thereof, and the housing base 120 includes a housing cover mounting part (not shown) formed at the outer circumference thereof to form a mutual engagement structure.

The housing cover 110 and the housing base 120 include a through-opening 113 and a through-opening (not shown), respectively, so that the input shaft 2 and the output shaft 3 and a torsion bar 5 for directly interconnecting the input shaft 2 and the output shaft 3 can be penetratingly disposed therein.

The magnet unit 200 includes a magnet ring 220 rotatably accommodated in the housing 100 in such a manner as to be connected to one end of one of the input shaft 2 and the output shaft 3.

In other words, the magnet unit 200 is connected to any one of the input shaft and the output shaft, i.e., to the input shaft 2 in this embodiment so that the magnet unit 20 rotates together with the input shaft 2 to form a structure in which the magnet unit 200 is disposed within the housing 100 so as to perform a relative rotation with respect to the housing 100.

The magnet unit 200 can be configured in various manners, but includes a magnet ring 220 in this embodiment.

Although not shown in this embodiment, the magnet unit may include a magnet holder to take a configuration in which the magnet holder supports the magnet ring 220 on the input shaft side. Although clearly not shown in the drawings, the magnet ring 220 of the present invention forms a structure in which N and S poles or S and N poles are arranged or arranged to be magnetized to form a magnetic field in the longitudinal directions of the input shaft 2 and the output shaft 3.

The magnet ring may be provided in plural numbers, but is provided in single number in this embodiment. The magnet ring 220 is configured such that N poles and S poles are alternately arranged. The magnet ring 220 is magnetized such that a magnetic field is formed in the longitudinal direction of the input shaft and the output shaft.

The collector unit 300 is accommodated in the housing in such a manner as to be at least partially fixedly mounted to one end of the other of the input shaft and the output shaft, i.e., to the output shaft 3 side in this embodiment so that a relative rotation can be performed with respect to the housing 100.

In addition, the collector unit 300 is at least partially disposed at the outer side of the magnet ring 220 in a radial direction of the input shaft 2 and the output shaft 3 so that the collector unit 300 forms a magnetic path of the magnetic field formed at the magnet ring 220 of the magnet unit 200 or focuses the magnetic field for transfer to the sensing unit 400 to achieve a more accurate detection function.

The sensing unit 400 is implemented as a torque sensor that is disposed at the outer circumference of the collector unit 300 and detects the magnetic field focused by the collector unit 300. The sensing unit 400 is implemented as a contactless type sensor such as a hall sensor. The sensing unit 400 may further include a separate sensor, if necessary.

In this embodiment, the sensing unit is implemented as a single torque sensor, but may take a configuration in which two torque sensors are provided so as to improve the accuracy of sensitivity and implement a fail-safe function through a signal outputted from one of the torque sensors when the other fails.

Meanwhile, the collector unit 300 of the present invention includes a lower collector 320 and a fixing collector 330.

The lower collector 320 is connected to the output shaft so as to rotate together with the output shaft.

A lower collector sleeve (not shown) and a lower collector holder (not shown) may be provided between the lower collector 320 and the output shaft 3. The lower collector sleeve is connected at one end thereof to the output shaft 3. The connection between the lower collector sleeve and the output shaft 3 can be achieved in various coupling manners such as welding, plastic snap-fitting, and caulking within a range of preventing a relative rotation therebetween.

In addition, the lower collector sleeve may be modified in various manners depending on a design specification, such as being implemented as a steel structure or a synthetic resin structure.

Further, the lower collector holder is connected to the outer circumference of the lower collector sleeve. The lower collector holder is a constituent element that interconnects the lower collector sleeve and the lower collector, and ultimately implements a connection function of preventing a relative rotation between the input shaft and the lower collector 320.

The lower collector 320 is made of a magnetic material such as a permalloy, a silicon steel plate, or a stainless steel plate. The material and manufacture method of the lower collector 320 can be modified in various manners within a range of forming a predetermined structure, such as being press-machined or being cast.

The lower collector 320 includes a lower collector ring 321 and a lower collector tooth array 323.

The lower collector ring 321 has a predetermined annular shape formed in the rotational direction of the output shaft 3. The lower collector tooth array 323 is composed of a plurality of lower collector teeth which are formed radially inwardly from an inner circumferential surface of the lower collector ring 321 so as to be circumferentially spaced apart from each other at equal angular intervals on a plane perpendicular to the output shaft.

In the meantime, the fixing collector 330 is fixed in position to the housing 100 in such a manner as to be disposed in a spaced manner at the outer circumferences of the upper collector 310 and the lower collector 320 so that a sensing unit 400 implemented as a torque sensor is disposed between respective ends of the fixing collector 330.

The fixing collector 330 includes an upper fixing collector 340 and a lower fixing collector 350.

The upper fixing collector 340 includes an upper fixing plate 341 and an upper fixing terminal 343.

The upper fixing plate 341 is formed in an arcuate shape at the outer circumference of the magnet ring 220, and the upper fixing terminal 343 is formed so as to extend from the outer circumferential end of the upper fixing plate 341 toward the torque sensor 400. The upper fixing plate 341 may take a configuration in which the upper fixing plate 341 is overlapped on the magnet ring 220 when viewed from a plane perpendicular to the input shaft and the output shaft, more preferably, a distance between an inner arcuate surface and an outer arcuate surface of the upper fixing plate 341 is larger than a distance between an inner circumferential surface and an outer circumferential surface of the magnet ring 220, thereby minimizing leakage of a magnetic flux from the magnet ring 220.

The upper fixing terminal 343 is formed so as to extend from the outer circumferential end of the upper fixing plate 341 toward the torque sensor 400. The upper fixing terminal 343 has a predetermined bent shape so that an end of the upper fixing terminal 343 approaches the torque sensor 400 to reduce an air gap, thereby increasing a transferability of the focused magnetic flux to the torque sensor 400 to achieve a more accurate detection of the torque.

The upper fixing plate 341 and the upper fixing terminal 343 are formed integrally with each other. One end of the upper fixing plate 341 is disposed in proximity to the magnet ring 220, and the an end of the upper fixing terminal 343 disposed in proximity to the torque sensor 400 so as to be opposite to the magnet ring 220.

The lower fixing collector 350 includes a lower fixing plate 351 and a lower fixing terminal 353. The entire structure of the lower fixing collector 350 is the same as that of the upper fixing collector 340, but may take a configuration that is slightly different from that of the upper fixing collector 340, if necessary.

The lower fixing plate 351 is formed in an arcuate shape at the outer circumference of the lower collector 320. The lower fixing plate 351 may take a configuration in which the lower fixing plate 351 is overlapped on the lower collector ring 321 of the lower collector 320 when viewed from a plane perpendicular to the input shaft and the output shaft, more preferably, a distance between an inner arcuate surface and an outer arcuate surface of the lower fixing plate 351 is larger than a distance between an inner circumferential surface and an outer circumferential surface of the lower collector ring 321, thereby minimizing leakage of a magnetic flux from the lower collector ring.

The lower fixing terminal 353 is formed so as to extend from the outer circumferential end of the lower fixing plate 351 toward the torque sensor 400. The lower fixing terminal 353 has a predetermined bent shape so that an end of the lower fixing terminal 353 approaches the torque sensor 400 to reduce an air gap, thereby increasing a transferability of the focused magnetic flux to the torque sensor 400 to achieve a more accurate detection of the torque.

The lower fixing plate 351 and the lower fixing terminal 353 are formed integrally with each other. One end of the lower fixing plate 351 is disposed in proximity to the lower collector 320, and the an end of the lower fixing terminal 353 disposed in proximity to the torque sensor 400 so as to be opposite to the lower collector 320.

The upper fixing plate of the upper fixing collector and the lower fixing plate of the lower fixing collector are different from each other in terms of a radial width, and the fixing collector may take a structure in which the length of the upper fixing plate is larger than that of the lower fixing plate.

The feature of the present invention resides in the single magnet ring, the single lower collector corresponding to the magnet ring, and the fixing collector structure. Accordingly, the present invention can reduce the manufacturing costs and improve or maintain the torque sensing performance.

Figure 3:
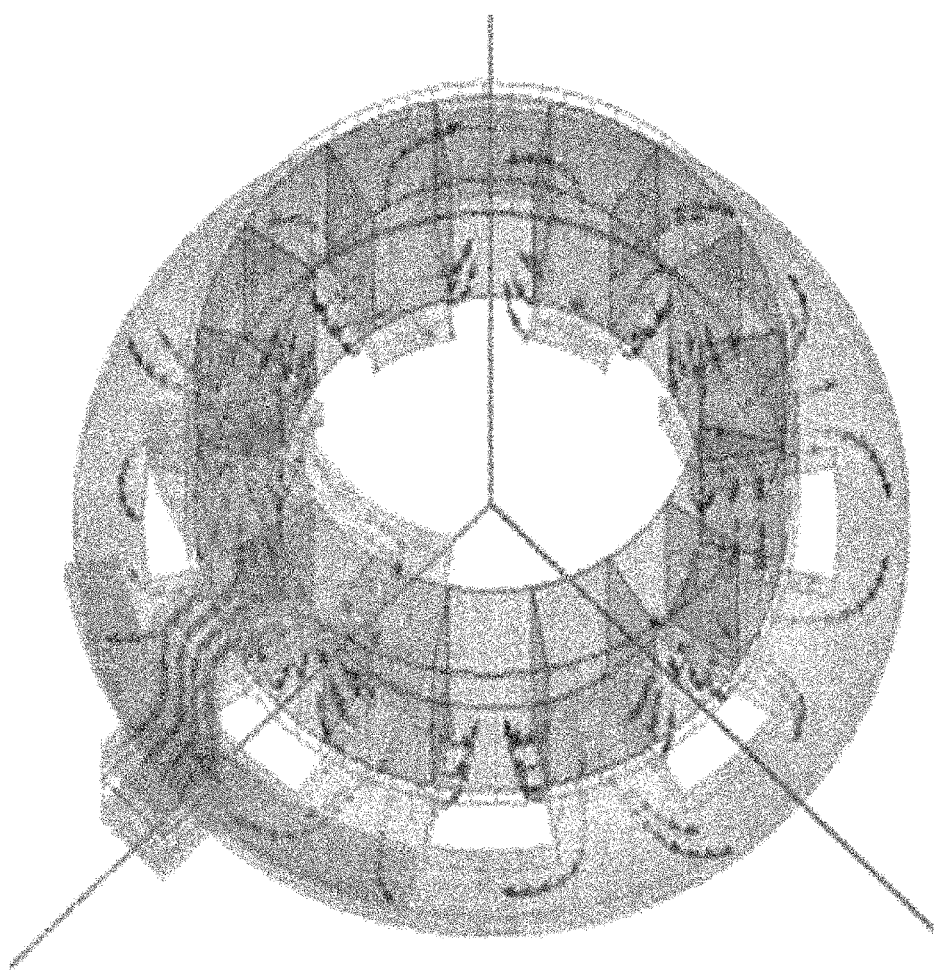
FIG. 3 is a partially assembled view showing a torque sensor device according to one embodiment of the present invention.

In addition, in the case where the magnet ring is magnetized in an axial direction of the input shaft and output shaft, when there is no torsion between the input shaft and the output shaft, the N pole and the S pole of a magnetic field collected by the lower collector are arranged in a ratio of 50:50 to form a magnetic neutral state (see FIG. 3).

On the other hand, when there is torsion between the input shaft and the output shaft, the N pole and the S pole of the magnetic field collected by the lower collector are arranged beyond the ratio of 50:50 to form a non-uniform magnetic state. In addition, the lower collector tooth array causes a change in the corresponding areas of the N pole and S pole to form a magnetic path through which a magnetic force in proportion to the area change is induced by the fixing collector and returns to an upper portion of the magnet ring 220, at which time, the torque sensor can detect a change in the magnetic field to sense a given amount of torsion generated.

Figure 2:
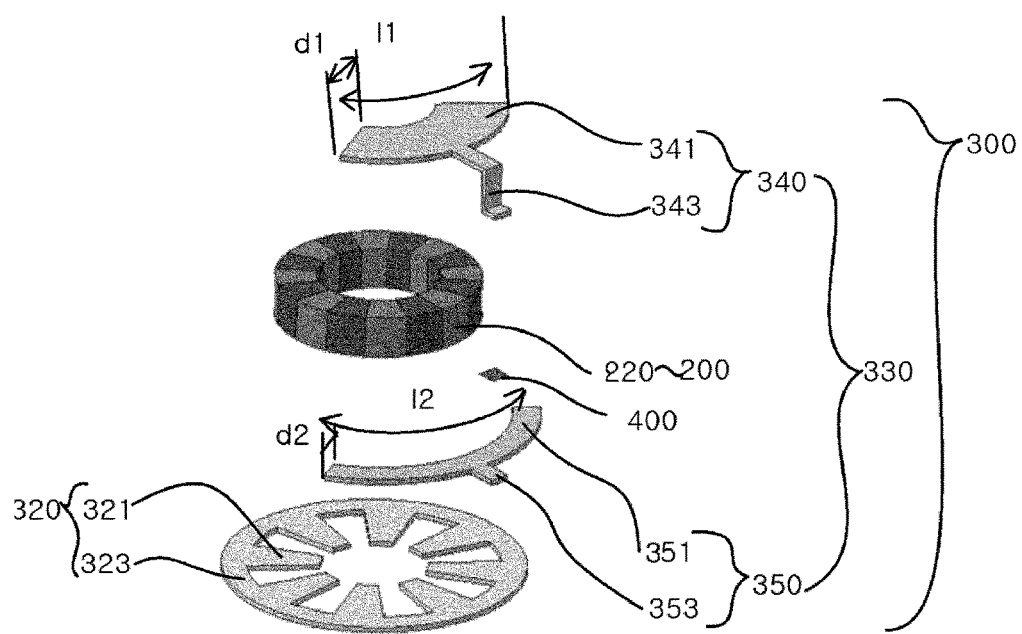
FIG. 2 is a partially exploded perspective view showing a collector unit of a torque sensor device according to one embodiment of the present invention.
Figure 4:
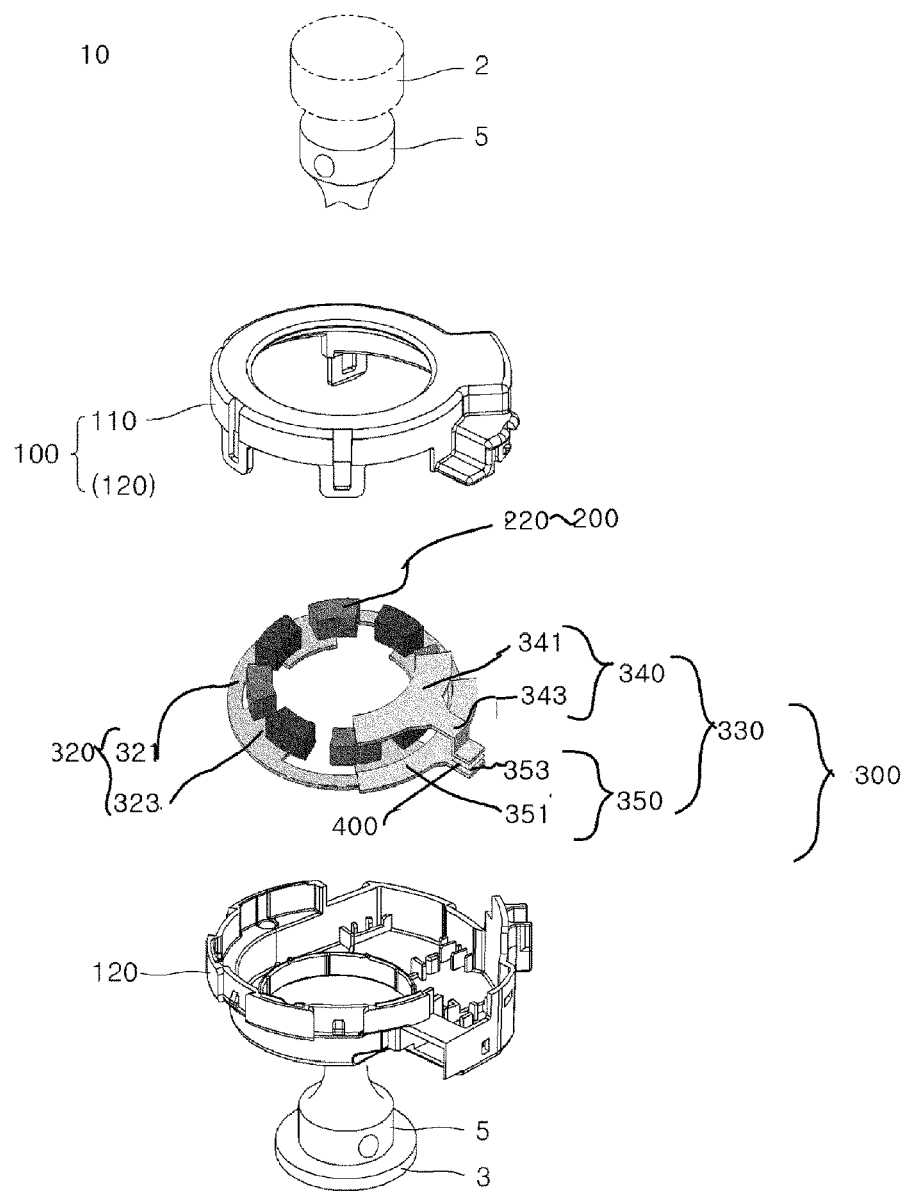
FIG. 4 is a schematic exploded perspective view showing a torque sensor device according to another embodiment of the present invention.
Figure 5:
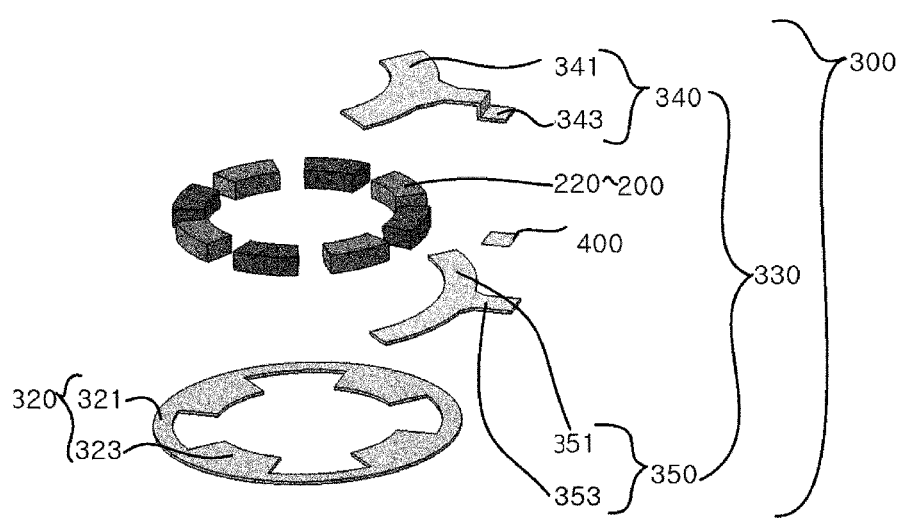
FIG. 5 is a partially exploded perspective view showing a collector unit of a torque sensor device according to another embodiment of the present invention.

In the meantime, the present invention may take another structure other than the magnet ring as described in one embodiment shown in FIGS. 1 to 3, i.e., a structure implemented as a magnet unit including a magnet block. Another embodiment of the present invention will be described hereinafter with reference to FIGS. 4 and 5. The same reference numeral and name are used to denote the same element and hence a repeated description will be omitted.

Unlike the aforementioned embodiment implemented as the magnet ring, the magnet unit 200 includes a magnet block 220 rotatably accommodated in the housing 100 in such a manner as to be connected to one end of one of the input shaft 2 and the output shaft 3.

In other words, the magnet unit 200 is connected to any one of the input shaft and the output shaft, i.e., to the input shaft 2 in this embodiment so that the magnet unit 20 rotates together with the input shaft 2 to form a structure in which the magnet unit 200 is disposed within the housing 100 so as to perform a relative rotation with respect to the housing 100. The magnet unit 200 can be configured in various manners, but includes a magnet block 220 in this embodiment.

Although not shown in this embodiment, the magnet unit may include a magnet holder to take a configuration in which the magnet holder supports the magnet block 220 on the input shaft side. The magnet block 220 of the present invention forms a structure in which different polarities are arranged in a circumferential direction of the input shaft 2 and the output shaft 3, i.e., N and S poles or S and N poles are arranged or arranged to be magnetized in a circumferential direction.

The magnet block is provided in plural numbers, and takes a structure in which the plurality of magnet blocks is arranged so as to be circumferentially spaced apart from each other at equal angular intervals in the rotational direction of the input shaft and the output shaft. The plurality of magnet blocks may take a structure in which they are arranged so as to be equidistantly spaced apart from each other, but the magnet ring is provided in single number in the above embodiment. Although clearly not shown in the drawings, each of the magnet blocks 220 is configured such that N poles and S poles are arranged to be magnetized in the vertical direction, i.e., in the longitudinal direction of the input shaft and the output shaft so that the magnet blocks 220 forms a magnetic field in the longitudinal direction of the input shaft and the output shaft.

The collector unit 300 is accommodated in the housing in such a manner as to be at least partially fixedly mounted to one end of the other of the input shaft and the output shaft, i.e., to the output shaft 3 side in this embodiment so that a relative rotation can be performed with respect to the housing 100.

In addition, In addition, the collector unit 300 is at least partially disposed at the outer side of the magnet block 220 in a radial direction of the input shaft 2 and the output shaft 3 so that the collector unit 300 forms a magnetic path of the magnetic field formed at the magnet block 220 of the magnet unit 200 or focuses the magnetic field for transfer to the sensing unit 400 to achieve a more accurate detection function.

The sensing unit 400 is implemented as a torque sensor that is disposed at the outer circumference of the collector unit 300 and detects the magnetic field focused by the collector unit 300. The sensing unit 400 may further include a separate sensor, if necessary.

In this embodiment, the sensing unit is implemented as a single torque sensor, but may take a configuration in which two torque sensors are provided so as to improve the accuracy of sensitivity and implement a fail-safe function through a signal outputted from one of the torque sensors when the other fails.

Meanwhile, the collector unit 300 of the present invention includes a lower collector 320 and a fixing collector 330.

The lower collector 320 is connected to the output shaft so as to rotate together with the output shaft.

A lower collector sleeve (not shown) and a lower collector holder (not shown) may be provided between the lower collector 320 and the output shaft 3. The lower collector sleeve is connected at one end thereof to the output shaft 3. The connection between the lower collector sleeve and the output shaft 3 can be achieved in various coupling manners such as welding, plastic snap-fitting, and caulking within a range of preventing a relative rotation therebetween.

In addition, the lower collector sleeve may be modified in various manners depending on a design specification, such as being implemented as a steel structure or a synthetic resin structure.

Further, the lower collector holder is connected to the outer circumference of the lower collector sleeve. The lower collector holder is a constituent element that interconnects the lower collector sleeve and the lower collector, and ultimately implements a connection function of preventing a relative rotation between the input shaft and the lower collector 320.

The lower collector 320 is made of a magnetic material such as a permalloy, a silicon steel plate, or a stainless steel plate. The material and manufacture method of the lower collector 320 can be modified in various manners within a range of forming a predetermined structure, such as being press-machined or being cast.

The lower collector 320 includes a lower collector ring 321 and a lower collector tooth array 323.

The lower collector ring 321 has a predetermined annular shape formed in the rotational direction of the output shaft 3. The lower collector tooth array 323 is composed of a plurality of lower collector teeth which are formed radially inwardly from an inner circumferential surface of the lower collector ring 321 so as to be circumferentially spaced apart from each other at equal angular intervals on a plane perpendicular to the output shaft.

In the meantime, the fixing collector 330 is fixed in position to the housing 100 in such a manner as to be disposed in a spaced manner at the outer circumferences of the upper collector 310 and the lower collector 320 so that a sensing unit 400 is disposed between respective ends of the fixing collector 330.

The fixing collector 330 includes an upper fixing collector 340 and a lower fixing collector 350.

The upper fixing collector 340 includes an upper fixing plate 341 and an upper fixing terminal 343.

The upper fixing plate 341 is formed in an arcuate shape at the outer circumference of the magnet block 220, and the upper fixing terminal 343 is formed so as to extend from the outer circumferential end of the upper fixing plate 341 toward the torque sensor 400. The upper fixing plate 341 may take a configuration in which the upper fixing plate 341 is overlapped on the magnet ring 220 when viewed from a plane perpendicular to the input shaft and the output shaft, more preferably, a distance between an inner arcuate surface and an outer arcuate surface of the upper fixing plate 341 is larger than a distance between an inner circumferential surface and an outer circumferential surface of the magnet ring 220, thereby minimizing leakage of a magnetic flux from the magnet ring 220.

The upper fixing terminal 343 is formed so as to extend from the outer circumferential end of the upper fixing plate 341 toward the torque sensor 400. The upper fixing terminal 343 has a predetermined bent shape so that an end of the upper fixing terminal 343 approaches the torque sensor 400 to reduce an air gap, thereby increasing a transferability of the focused magnetic flux to the torque sensor 400 to achieve a more accurate detection of the torque.

The upper fixing plate 341 and the upper fixing terminal 343 are formed integrally with each other. One end of the upper fixing plate 341 is disposed in proximity to the magnet block 220, and the an end of the upper fixing terminal 343 disposed in proximity to the torque sensor 400 so as to be opposite to the magnet block 220.

The lower fixing collector 350 includes a lower fixing plate 351 and a lower fixing terminal 353. The entire structure of the lower fixing collector 350 is the same as that of the upper fixing collector 340, but may take a configuration that is slightly different from that of the upper fixing collector 340, if necessary.

The lower fixing plate 351 is formed in an arcuate shape at the outer circumference of the lower collector 320. The lower fixing plate 351 may take a configuration in which the lower fixing plate 351 is overlapped on the lower collector ring 321 of the lower collector 320 when viewed from a plane perpendicular to the input shaft and the output shaft, more preferably, a distance between an inner arcuate surface and an outer arcuate surface of the lower fixing plate 351 is larger than a distance between an inner circumferential surface and an outer circumferential surface of the lower collector ring 321, thereby minimizing leakage of a magnetic flux from the lower collector ring.

The lower fixing terminal 353 is formed so as to extend from the outer circumferential end of the lower fixing plate 351 toward the torque sensor 400. The lower fixing terminal 353 has a predetermined bent shape so that an end of the lower fixing terminal 353 approaches the torque sensor 400 to reduce an air gap, thereby increasing a transferability of the focused magnetic flux to the torque sensor 400 to achieve a more accurate detection of the torque.

The lower fixing plate 351 and the lower fixing terminal 353 are formed integrally with each other. One end of the lower fixing plate 351 is disposed in proximity to the lower collector 320, and the an end of the lower fixing terminal 353 disposed in proximity to the torque sensor 400 so as to be opposite to the lower collector 320.

The upper fixing plate of the upper fixing collector and the lower fixing plate of the lower fixing collector are different from each other in terms of a radial width, and the fixing collector may take a structure in which the length of the upper fixing plate is larger than that of the lower fixing plate.

The feature of the present invention resides in the single magnet ring, the single lower collector corresponding to the magnet ring, and the fixing collector structure. Accordingly, the present invention can reduce the manufacturing costs and improve or maintain the torque sensing performance.

In addition, in the case where the magnet block is magnetized in an axial direction of the input shaft and output shaft, when there is no torsion between the input shaft and the output shaft, the N pole and the S pole of a magnetic field collected by the lower collector are arranged in a ratio of 50:50 to form a magnetic neutral state.

On the other hand, when there is torsion between the input shaft and the output shaft, the N pole and the S pole of the magnetic field collected by the lower collector are arranged beyond the ratio of 50:50 to form a non-uniform magnetic state. In addition, the lower collector tooth array causes a change in the corresponding areas of the N pole and S pole to form a magnetic path through which a magnetic force in proportion to the area change is induced by the fixing collector and returns to an upper portion of the magnet block 220, at which time, the torque sensor can detect a change in the magnetic field to sense a given amount of torsion generated.

Also, meanwhile, in the aforementioned embodiments, the collector unit of the present invention takes a structure which includes the lower collector including the lower collector tooth array extending in a radial center direction and the lower collector ring including the lower collector tooth array, but the collector unit may further include an upper collector. Similarly to the aforementioned case, the same reference numeral and name are used to denote the same, substantially the same or equivalent element and hence a repeated description will be omitted.

Figure 6:
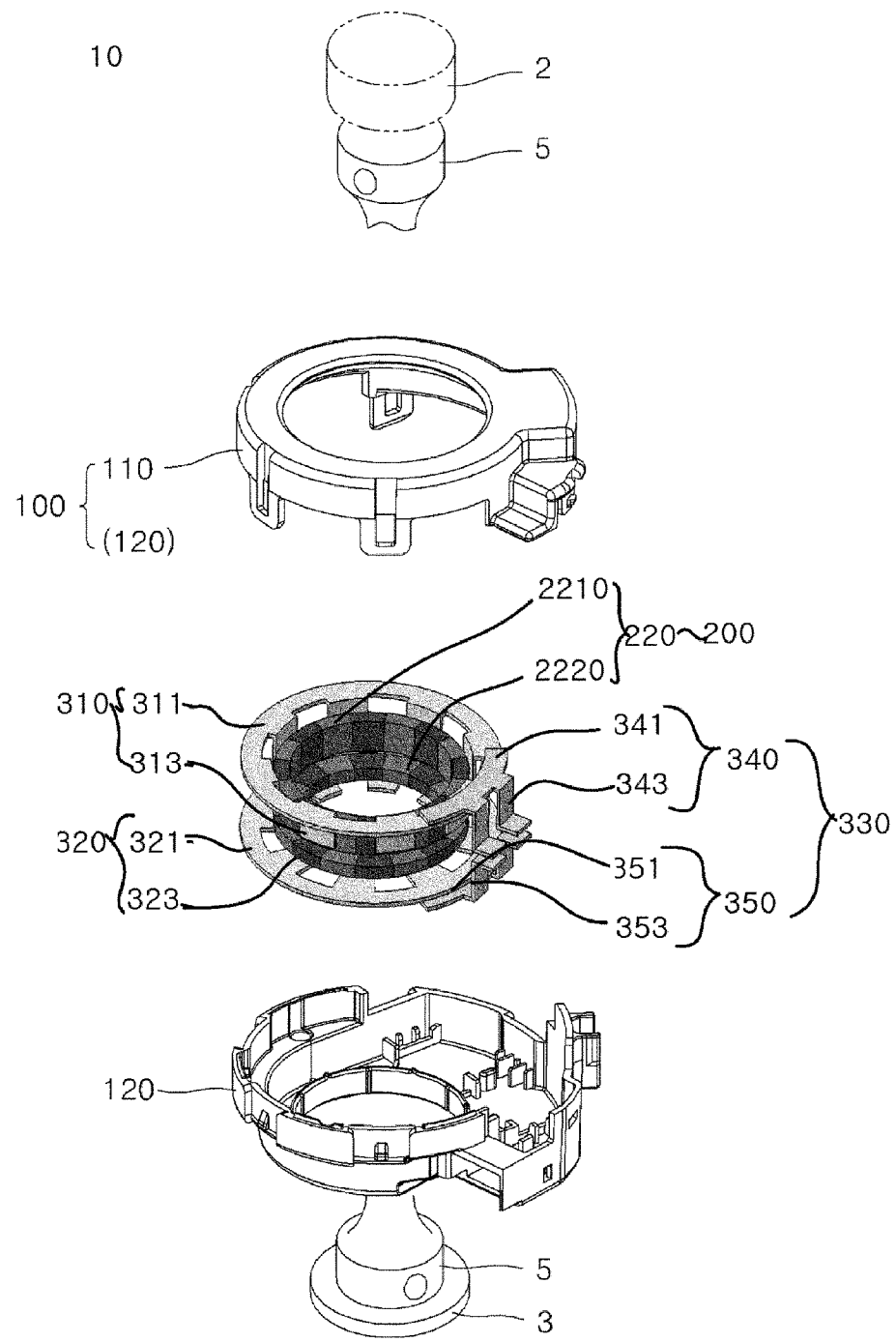
FIG. 6 is a schematic exploded perspective view showing a torque sensor device according to still another embodiment of the present invention.
Figure 7:
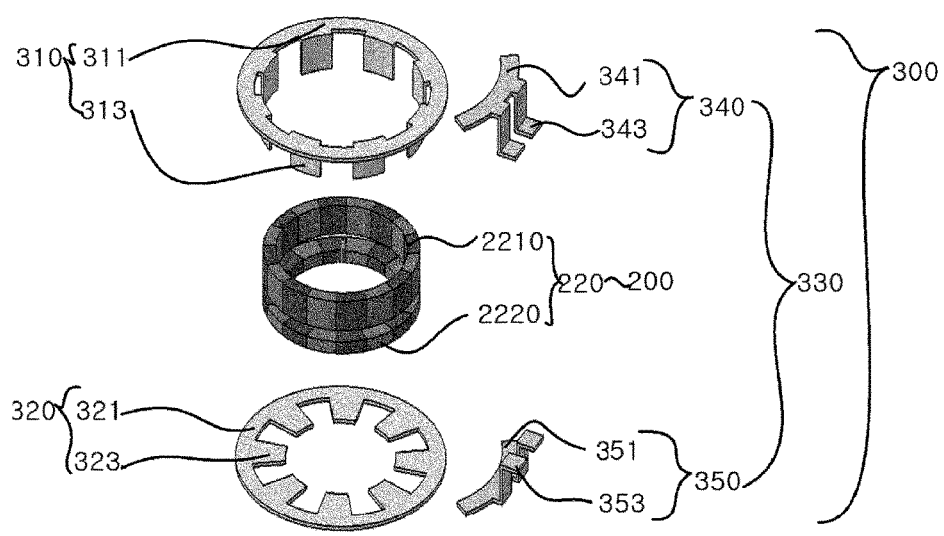
FIG. 7 is a partially exploded perspective view showing a collector unit of a torque sensor device according to still another embodiment of the present invention.
Figure 8:
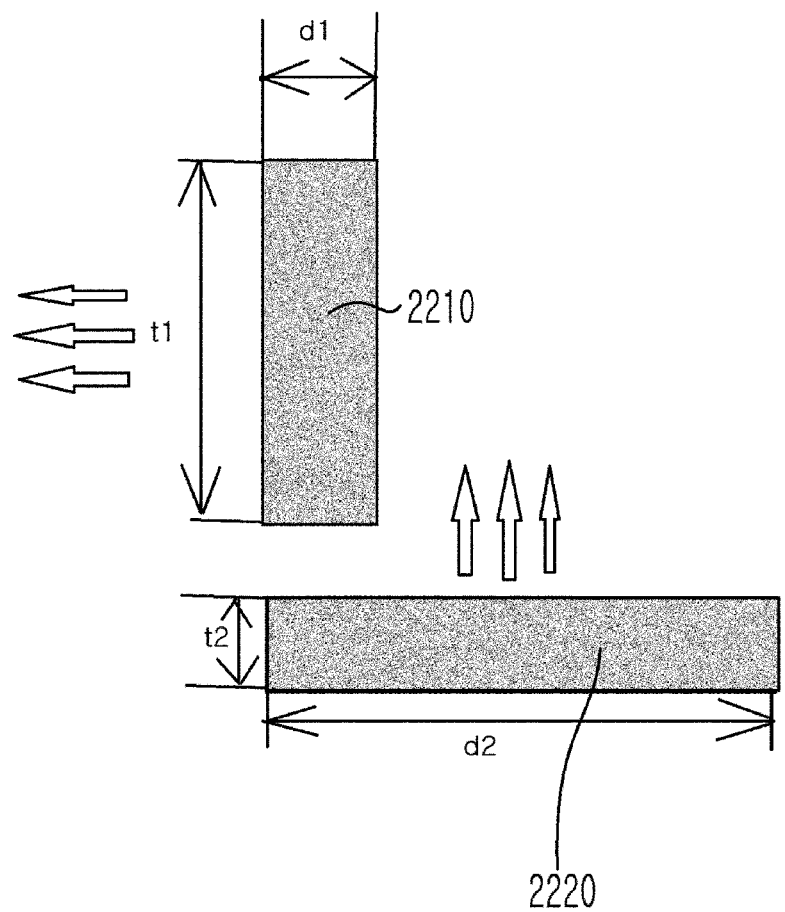
FIG. 8 is a partial cross-sectional view of a collector unit.

Referring to FIGS. 6 to 8, a torque sensor device 10 according to still another embodiment of the present invention includes a housing 100, a magnet unit 200, a collector unit 300, and a sensing unit 400. The torque sensor device 10 of the present invention is disposed between the input shaft 2 and the output shaft 3 and detects a torque between the input shaft 2 and the output shaft 3 through a relative rotation displacement the input shaft 2 and the output shaft 3.

In this embodiment, the magnet unit 20 includes a magnet ring 220 rotatably accommodated in the housing 100 in such a manner as to be connected to one end of one of the input shaft 2 and the output shaft 3.

In other words, the magnet unit 200 is connected to any one of the input shaft and the output shaft, i.e., to the input shaft 2 in this embodiment so that the magnet unit 20 rotates together with the input shaft 2 to form a structure in which the magnet unit 200 is disposed within the housing 100 so as to be able to perform a relative rotation with respect to the housing 100.

The magnet unit 200 can be configured in various manners, but includes a magnet ring 220 in this embodiment.

Although not shown in this embodiment, the magnet unit may include a magnet holder to take a configuration in which the magnet holder supports the magnet ring 220 on the input shaft side. The magnet block 220 of the present invention forms a structure in which different polarities are arranged in a circumferential direction of the input shaft 2 and the output shaft 3, i.e., N and S poles or S and N poles are arranged or arranged to be magnetized in a circumferential direction.

In this embodiment, the magnet ring is provided in plural numbers. More specifically, the magnet ring is provided in pair. The magnet ring 220 includes an upper magnet ring 2210 and a lower magnet ring 2220. An upper magnet ring 2210 is disposed to correspond to an upper collector 310 of a collector unit which will be described later, and a lower magnet ring 2220 is disposed to confront a lower collector 320. N poles and S poles of each of the upper magnet ring 2210 and the lower magnet ring 2220 are alternately arranged in a circumferential direction, and the aspect ratio (ARu) of the upper ring magnet 2210 is less than the aspect ratio (AB1) of the lower magnet ring 2220 with respect to the cross-section formed in the longitudinal direction of the input shaft 2 and the output shaft 3.

In other words, as shown in FIG. 8, the aspect ratio (AR1=d1/t1) of the upper magnet ring 2210 is smaller than the aspect ratio (AR2=d2/t2) of the lower magnet ring 2220.

By virtue of such a configuration, the upper magnet ring 2210 and the lower magnet ring 2220 form magnetic field lines as shown in FIG. 8. The magnetic field lines of the upper magnet ring 2210 are formed in a circumferential direction on a circumferential surface of the upper magnet ring 2210, more specifically on an outer circumferential surface of the upper magnet ring 2210, which is parallel to the longitudinal direction of the input shaft 2 and the output shaft 3 to form magnetic field lines with another polarity adjacent circumferentially, and the magnetic field lines of the lower magnet ring 2220 are formed in the longitudinal direction of the input shaft and the output shaft on a circumferential surface of the lower magnet ring, which is perpendicular to the longitudinal direction of the input shaft 2 and the output shaft 3 while forming magnetic field lines with another polarity adjacent circumferentially.

In other words, the upper magnet ring 2210 mainly forms a magnetic field between other polarities on the inner and outer circumferential surfaces thereof, the lower magnet ring 2220 mainly forms a magnetic field on surfaces oriented toward the input shaft and the output shaft.

The collector unit 300 is accommodated in the housing in such a manner as to be at least partially fixedly mounted to one end of the other of the input shaft and the output shaft, i.e., to the output shaft 3 side in this embodiment so that a relative rotation can be performed with respect to the housing 100.

In addition, the collector unit 300 is at least partially disposed at the outer side of the magnet ring 220 in a radial direction of the input shaft 2 and the output shaft 3 so that the collector unit 300 forms a magnetic path of the magnetic field formed at the magnet ring 220 of the magnet unit 200 or focuses the magnetic field for transfer to the sensing unit 400 to achieve a more accurate detection function.

The sensing unit 400 is implemented as a torque sensor that is disposed at the outer circumference of the collector unit 300 and detects the magnetic field focused by the collector unit 300. The sensing unit 400 may further include a separate sensor, if necessary.

In this embodiment, the sensing unit is implemented as a single torque sensor, but may take a configuration in which two torque sensors are provided so as to improve the accuracy of sensitivity and implement a fail-safe function through a signal outputted from one of the torque sensors when the other fails.

Meanwhile, the collector unit 300 of the present invention includes an upper collector 310, a lower collector 320 and a fixing collector 330.

The upper collector 310 is disposed so as to be oriented toward any one of the input shaft and the output shaft, and the lower collector 320 is disposed so as to be spaced apart from the upper collector 310. The fixing collector 330 is fixed in position to the housing 100 in such a manner as to be disposed in a spaced manner at the outer circumferences of the upper collector 310 and the lower collector 320 so that a sensing unit 400 implemented as a torque sensor is disposed between respective ends of the fixing collector 330.

The upper collector 310 includes an upper collector ring 311 and an upper collector tooth array 313.

The upper collector ring 311 has a predetermined annular shape formed at the other of the input shaft 2 and the output shaft 3, i.e., on the outer circumference of the input shaft 2 in this embodiment. The upper collector tooth array 313 is composed of a plurality of upper collector teeth, which are formed extending downwardly from the inner circumferential end of the upper collector ring 311 so as to be circumferentially spaced apart from each other at equal angular intervals in the longitudinal direction of the input shaft 2.

In addition, the lower collector 320 is connected to the output shaft so as to rotate together with the output shaft.

A lower collector sleeve (not shown) and a lower collector holder (not shown) may be provided between the lower collector 320 and the output shaft 3. The aforementioned upper collector may take the same configuration as that of the lower collector 320. The lower collector sleeve is connected at one end thereof to the output shaft 3. The connection between the lower collector sleeve and the output shaft 3 can be achieved in various coupling manners such as welding, plastic snap-fitting, and caulking within a range of preventing a relative rotation therebetween.

In addition, the lower collector sleeve may be modified in various manners depending on a design specification, such as being implemented as a steel structure or a synthetic resin structure.

Further, the lower collector holder is connected to the outer circumference of the lower collector sleeve. The lower collector holder is a constituent element that interconnects the lower collector sleeve and the lower collector, and ultimately implements a connection function of preventing a relative rotation between the input shaft and the lower collector 320.

The lower collector 320 includes a lower collector ring 321 and a lower collector tooth array 323.

The lower collector ring 321 has a predetermined annular shape formed in the rotational direction of the output shaft 3. The lower collector tooth array 323 is composed of a plurality of lower collector teeth which are formed radially inwardly from an inner circumferential surface of the lower collector ring 321 so as to be circumferentially spaced apart from each other at equal angular intervals on a plane perpendicular to the output shaft.

In other words, the upper collector tooth array and the lower collector tooth array establish a vertical arrangement relation.

In the meantime, in this embodiment, the magnet ring is provided in plural numbers. More specifically, the magnet ring is provided in pair. The magnet ring 220 includes an upper magnet ring 2210 and a lower magnet ring 2220. The lengths of the upper magnet ring 2210 and the lower magnet ring 2220 in the longitudinal direction of the input shaft and the output shaft are different from each other. That is, the length (t1) of the upper magnet ring 2210 in the longitudinal direction of the input shaft and the output shaft is larger than the length (t2) of the lower magnet ring 2220 in the longitudinal direction of the input shaft and the output shaft.

In this case, the radial length (l2) of the lower collector tooth array 323, which is perpendicular to the longitudinal direction of the input shaft and the output shaft is larger than the radial direction (d2) of the lower magnet ring 2220, which is perpendicular to the longitudinal direction of the input shaft and the output shaft so that collection of a magnetic field generated from the lower magnet ring 2220 can be facilitated.

In the meantime, the fixing collector 330 is fixed in position to the housing 100 in such a manner as to be disposed in a spaced manner at the outer circumferences of the upper collector 310 and the lower collector 320 so that a sensing unit 400 implemented as a torque sensor is disposed between respective ends of the fixing collector 330.

The fixing collector 330 includes an upper fixing collector 340 and a lower fixing collector 350.

The upper fixing collector 340 includes an upper fixing plate 341 and an upper fixing terminal 343.

The upper fixing plate 341 is formed in an arcuate shape at the outer circumference of the upper collector 310, and the upper fixing terminal 343 is formed so as to extend from the outer circumferential end of the upper fixing plate 341 toward the torque sensor 400. The upper fixing plate 341 may take a configuration in which the upper fixing plate 341 is overlapped on the upper collector ring 311 of the upper collector 310 when viewed from a plane perpendicular to the input shaft and the output shaft, more preferably, a distance between an inner arcuate surface and an outer arcuate surface of the upper fixing plate 341 is larger than a distance between an inner circumferential surface and an outer circumferential surface of the upper collector ring 311, thereby minimizing leakage of a magnetic flux from the upper collector ring 311.

The upper fixing terminal 343 has a predetermined bent shape so that an end of the upper fixing terminal 343 approaches the torque sensor 400 to reduce an air gap, thereby increasing a transferability of the focused magnetic flux to the torque sensor 400 to achieve a more accurate detection of the torque.

The upper fixing plate 341 and the upper fixing terminal 343 are formed integrally with each other. One end of the upper fixing plate 341 is disposed in proximity to the upper collector 310, and the an end of the upper fixing terminal 343 disposed in proximity to the torque sensor 400 so as to be opposite to the upper collector 310.

The lower fixing collector 350 includes a lower fixing plate 351 and a lower fixing terminal 353. The entire structure of the lower fixing collector 350 is the same as that of the upper fixing collector 340, but may take a configuration that is slightly different from that of the upper fixing collector 340, if necessary.

The lower fixing plate 351 is formed in an arcuate shape at the outer circumference of the lower collector 320. The lower fixing plate 351 may take a configuration in which the lower fixing plate 351 is overlapped on the lower collector ring 321 of the lower collector 320 when viewed from a plane perpendicular to the input shaft and the output shaft, more preferably, a distance between an inner arcuate surface and an outer arcuate surface of the lower fixing plate 351 is larger than a distance between an inner circumferential surface and an outer circumferential surface of the lower collector ring 321, thereby minimizing leakage of a magnetic flux from the lower collector ring.

The lower fixing terminal 353 is formed so as to extend from the outer circumferential end of the lower fixing plate 351 toward the torque sensor 400. The lower fixing terminal 353 has a predetermined bent shape so that an end of the lower fixing terminal 353 approaches the torque sensor 400 to reduce an air gap, thereby increasing a transferability of the focused magnetic flux to the torque sensor 400 to achieve a more accurate detection of the torque.

The lower fixing plate 351 and the lower fixing terminal 353 are formed integrally with each other. One end of the lower fixing plate 351 is disposed in proximity to the lower collector 320, and the an end of the lower fixing terminal 353 disposed in proximity to the torque sensor 400 so as to be opposite to the lower collector 320.

As described above, the present invention can be modified in various manners within a range of detecting a torque applied to a shaft through a contactless type torque sensor.

INDUSTRIAL APPLICABILITY

The present invention can be utilized in a variety of industrial and technical fields, such as being implemented as a torque sensor for an electric bicycle or an electric motorcycle besides a steering wheel shaft for a motor vehicle within a range of detecting a torque applied to a shaft through a contactless type torque sensor.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

The invention claimed is:

1. A torque sensor device disposed between an input shaft and an output shaft and configured to detect a torque between the input shaft and the output shaft through a relative rotation displacement therebetween, the torque sensor device comprising:
a housing configured to accommodate an end of the input shaft and an end of the output shaft and fixed in position to be able to perform a relative rotation with respect to the input shaft and the output shaft:
a magnet unit rotatably accommodated in the housing in such a manner as to be connected to one end of one of the input shaft and the output shaft;
a collector unit rotatably accommodated in the housing in such a manner as to be at least partially connected to one end of the other of the input shaft and the output shaft, the collector unit being configured to form a magnetic circuit together with the magnet unit; and
a sensing unit including a torque sensor disposed at the outer circumference of the collector unit and configured to detect a magnetic field focused by the collector unit,
wherein the collector unit comprises a lower collector including an annular lower collector ring disposed radially and circumferentially at one end of the other of the input shaft and the output shaft,
wherein the magnet unit comprises a magnet ring,
wherein the collector unit further comprises;
an upper collector disposed to be oriented toward one of the input shaft and the output shaft;
a fixing collector fixed in position to the housing so as to be disposed at the outer circumferences of the upper collector and the lower collector in a spaced manner with the torque sensor interposed between one ends of the fixing collector, wherein the lower collector is disposed so as to be spaced apart from the upper collector,
wherein the upper collector comprises:
an annular upper collector ring disposed radially and circumferentially at one end of the other of the input shaft and the output shaft; and
an upper collector tooth array composed of a plurality of upper collector teeth which are formed extending downwardly from an inner circumferential end of the upper collector ring in such a manner as to be circumferentially spaced apart from each other at equal angular intervals,
wherein the lower collector further comprises a lower collector tooth array composed of a plurality of lower collector teeth which are formed extending radially from an inner circumferential end of the lower collector ring in such a manner as to be circumferentially spaced apart from each other at equal angular intervals,
wherein one of the upper collector tooth array and the lower collector tooth array is formed in the axial longitudinal direction of the input shaft and the output shaft, and
wherein the other of the upper collector tooth array and the lower collector tooth array is formed in the radial direction of the input shaft and the output shaft,
wherein the upper collector tooth array is formed at the output shaft in the longitudinal direction of the output shaft,
wherein the magnet ring is provided in pair, and the lengths of the two magnet rings in the axial longitudinal direction of the input shaft and the output shaft are different from each other,
wherein the magnet ring comprises:
an upper magnet ring disposed to correspond to the upper collector; and
a lower magnet ring disposed to confront the lower collector,
wherein N poles and S poles of each of the upper magnet ring and the lower magnet ring are alternately arranged in a circumferential direction, and
wherein the aspect ratio (ARu) of the upper ring magnet is less than the aspect ratio (AB1) of the lower magnet ring with respect to the cross-section formed in the longitudinal direction of the input shaft and the output shaft.

2. The torque sensor device according to claim 1, wherein a magnet ring having a larger length of the two magnet rings in the axial longitudinal direction of the input shaft and the output shaft is disposed at the upper collector tooth array, and wherein the length of the upper collector tooth array in the longitudinal direction of the output shaft is larger than the axial length of the magnet ring having the larger length of the two magnet rings in the axial longitudinal direction of the input shaft and the output shaft.

3. The torque sensor device according to claim 2, wherein a magnet ring having a smaller length of the two magnet rings in the axial longitudinal direction of the input shaft and the output shaft is disposed at the lower collector tooth array, and wherein the length of the lower collector tooth array in the radial direction of the output shaft is larger than the radial length of a magnet ring having a smaller length of the two magnet rings in the radial direction of the input shaft and the output shaft.

4. The torque sensor device according to claim 1, wherein the magnetic field lines of the upper magnet ring are formed in a circumferential direction on a circumferential surface of the upper magnet ring, which is parallel to the longitudinal direction of the input shaft and the output shaft, and wherein the magnetic field lines of the lower magnet ring are formed in the longitudinal direction of the input shaft and the output shaft on a circumferential surface of the lower magnet ring, which is perpendicular to the longitudinal direction of the input shaft and the output shaft.

* * * * *